United States Patent [19]

Dias et al.

[11] Patent Number: 4,785,446
[45] Date of Patent: Nov. 15, 1988

[54] DISTRIBUTED BIT SWITCHING OF A MULTISTAGE INTERCONNECTION NETWORK

[75] Inventors: Daniel M. Dias, Mahopac; Yeong-Chang Lien, Briarcliff Manor, both of N.Y.; Kiyoshi Maruyama, Campbell, Calif.

[73] Assignee: International Business Machines Corporation, Armonk, N.Y.

[21] Appl. No.: 927,988

[22] Filed: Nov. 7, 1986

[51] Int. Cl.$^4$ ............................................. H04Q 11/04
[52] U.S. Cl. ......................................... 370/58; 370/60
[58] Field of Search ......................... 370/58, 60, 63, 54

[56] References Cited

U.S. PATENT DOCUMENTS

| | | | |
|---|---|---|---|
| 3,766,322 | 10/1973 | Moffett et al. | 370/60 |
| 3,988,545 | 10/1976 | Kuemmerle | 370/60 |
| 4,022,982 | 5/1977 | Hemdal | 370/54 |
| 4,596,010 | 6/1986 | Beckner et al. | 370/60 |
| 4,679,190 | 7/1987 | Dias et al. | 370/60 |
| 4,696,000 | 9/1987 | Payne | 370/60 |

OTHER PUBLICATIONS

"Virtual Cut Through: A Network Computer Communications Switching Technique", Kermani et al., vol. 3, Computer Network, Sep. 79, pp. 267–286.

"Burst-Switching" IEEE Communications, pp. 36–42, Nov. 1983.

"Architecture for Integrated Voice/Data Switch", International Conference of Communications, Jun. 1980.

Primary Examiner—Robert L. Griffin
Assistant Examiner—Leslie Van Beek
Attorney, Agent, or Firm—Douglas W. Cameron

[57] ABSTRACT

This invention relates to a method of switching voice and data over a multistage interconnection network (MIN). More specifically, a plurality of bits are stored in respective storage locations of the switching elements of the MIN. Storage location of a switching element represents a particular time slot in a frame or a sequence of frames. Bits stored in each location represent specific conditions of the inputs and outputs of the switching elements and also indicate which inputs of the switching elements will be connected to which outputs of the switching elements. This storage of control information in the switching elements allows the switching network to rapidly and simultaneously change connections through the switching elements of the network.

10 Claims, 5 Drawing Sheets

AN NLOGN MULTI-STAGE INTERCONNECTION NETWORK

AN NLOGN MULTI-STAGE INTERCONNECTION NETWORK

SWITCHING ELEMENT FOR BASIC SCHEME

FIG. 3

CONFIGURATIONS OF A (2 x 2) SWITCHING ELEMENT

| CONFIGURATION | | ENCODING | | |
|---|---|---|---|---|
| | | BIT 2 | BIT 1 | BIT 0 |
| 30-1 | ↔ | 0 | 0 | — |
| | ↔ | 1 | 0 | 0 |
| | ↔ | 1 | 0 | 1 |
| 61-1  62-1  30-4  61-2  62-2 | ↔ | 0 | 1 | 0 |
| | ↔ | 0 | 1 | 1 |
| | ↔ | 1 | 1 | 0 |
| 30-7 | ↔ | 1 | 1 | 1 |

SWITCHING ELEMENT FOR MODIFIED SCHEME

INPUT ADAPTER

DISTRIBUTED BIT SWITCHING OF A MULTISTAGE INTERCONNECTION NETWORK

DESCRIPTION

1. Technical Field

This invention relates to a method of switching voice and data over a multistage interconnection network (MIN). More specifically, this invention is a method wherein a plurality of bits are stored in respective storage locations of the switching elements of the MIN. Each storage location in each switching element represents a particular time slot of a frame, and the bits stored in each location represent the state of inputs or outputs and the configuration of the switching element during the respective time slot.

2. Background of the Invention

The advantages of integrating data and voice services on a single switch has broadened the view of switch design. Traditionally, packet switching has been considered as the ideal mechanism for data communication. This is because data traffic is typically bursty making it amenable to statistical multiplexing and packet switching. For voice, the continuity in terms of time and sequence is required. Therefore, small and guaranteed switch delay is necessary for voice and is usually provided by a switch mechanism. The variable delay as a result of packet switching is a problem for achieving the fixed and small delay requirement for voice traffic.

To resolve the delay problem, multistage switching networks have been developed to support both voice and data switching. The integration of voice and data switching is made possible because the inherent self-routing technique allows the switching network to rapidly and simultaneously change connection paths through the network.

Two prominent multistage switching networks that have been developed are the fast packet switch from AT&T Bell Laboratories and the burst switch from General Telephone and Electronics. The fast packet switch uses a cut-through technique and buffers packets at intermediate stages in the multistage switching network. The cut-through technique is described in an article entitled, "Virtual Cut-Through: A New Computer Communication Switching Technique", by T. Kermani and L. Kleinrock. This article appears in the September 1979 issue of Computer Networks, Vol. 3, pp. 267–286. Cut-through technique and the buffering of packets allow voice and data packets to be rapidly transmitted through the network. However, due to contention, the switch through-put saturates at about 40% of port bandwidth utilization. Further, to keep packet delay and differential delay acceptable for voice switching, a much smaller bandwidth utilization is necessary. The burst switch, on the other hand, is a circuit switching based system with the feature of over commitment for available links. This switching system uses the silence detection technique to allow channels which have packet or voice bursts to compete for these links. However, as the number of voice bursts increases the probability that a burst will be lost increases. Thus, with the burst switch there is concern about packets being lost due link contention.

A method of switching voice and data over a multistage interconnection network is also described in a patent application filed by Y-C. Lien et al on Apr. 28, 1986, Ser. No. 856,321 now U.S. Pat. No. 4,679,190. Under this later method, each packet contains several address bits to route that packet through the network. Each packet also contains priority bit, and each packet with the highest priority level is ensured that it will not be blocked as it passes through the network. The problem, however, with this method is that it results in a delay of several milliseconds. Delay precludes the use of this method in applications requiring short delays such as in a token ring local area network.

The fast packet switch is described in U.S. Pat. No. 4,491,945 issued to J. S. Turner on Jan. 1, 1985. The burst switch of GTE is described in the following reference: S. R. Amstutz, "Burst Switching - A Method for Distributed and Integrated Voice and Data Switching", IEEE Communications Magazine, pp. 36–42, November 1983.

U.S. Pat. No. 4,539,676 to J. Lucas and U.S. Pat. No. 4,413,337 to J. Dauphin et al, both describe an integrated voice/data switching system; however, both patents separate the voice and data. Then, in both these patents, the voice traffic is switched through a different switching mechanism than that of the data traffic.

A paper submitted by Ross et al entitled, "An Architecture for Integrated Voice/Data Switch", was submitted to the 1980 International Conference of Communications of June of 1980 in Seattle, Wash. This paper describes a method of splitting incoming traffic into circuit and packet traffic. Circuit traffic is then stored separately from that of the packet traffic. The circuit traffic is then sent over a bus dedicated to circuit traffic, while the data is sent in a over a bus dedicated to data traffic. This dual bus transfer inherently limits the bandwidth of the system to that of the data and circuit busses.

SUMMARY OF THE INVENTION

It is, therefore, an object of this invention to provide high bandwidth integrated voice/data switching with distributed control and most importantly minimal delay.

It is a further object of this invention to provide an integrated voice/data switching system that can be used in connection with local area networks, as a second level switch in an integrated voice/data PBX (fifth generation), and as a switch in an integrated metropolitan area network.

Accordingly, this invention includes a method of controlling a multistage interconnection network for the switching of synchronous and asynchronous data. The network has a number of switch elements which are used to interconnect a number of conductive links. These conductive links are used to forward both synchronous and asynchronous data from selected inputs of the switching elements to selected outputs of the switching elements during each frame in the sequence of frames. The first step of the method of this invention comprises the steps of storing a plurality of bits in storage locations of a number of the switching elements of the network. The second step includes setting the configuration of each of the switch elements during each time slot to correspond to the configuration represented by a corresponding set of bits stored in each respective switch element. The configuration that each switching element assumes is then used to interconnect selected links at the inputs of that switching element to selected links at the outputs of that switching element. Each link is used to forward data from one switching element to another switching element.

This invention obtains the small delays by storing at each switch element the information necessary to set the configuration of that switch element during each time slot of each frame in a sequence of frames. Thus, with this short delay, this invention provides a switching method which can be used in applications requiring short delays. One such application is in connecting several token ring local area networks to construct one larger ring. Another such application is in a large voice/data network constructed by cascading a number of switches.

BRIEF DESCRIPTION OF THE DRAWINGS

FIG. 3 illustrates the various configurations that the switching elements can assume.

DESCRIPTION OF THE PREFERRED EMBODIMENT

BASIC SCHEME

Figure 1:
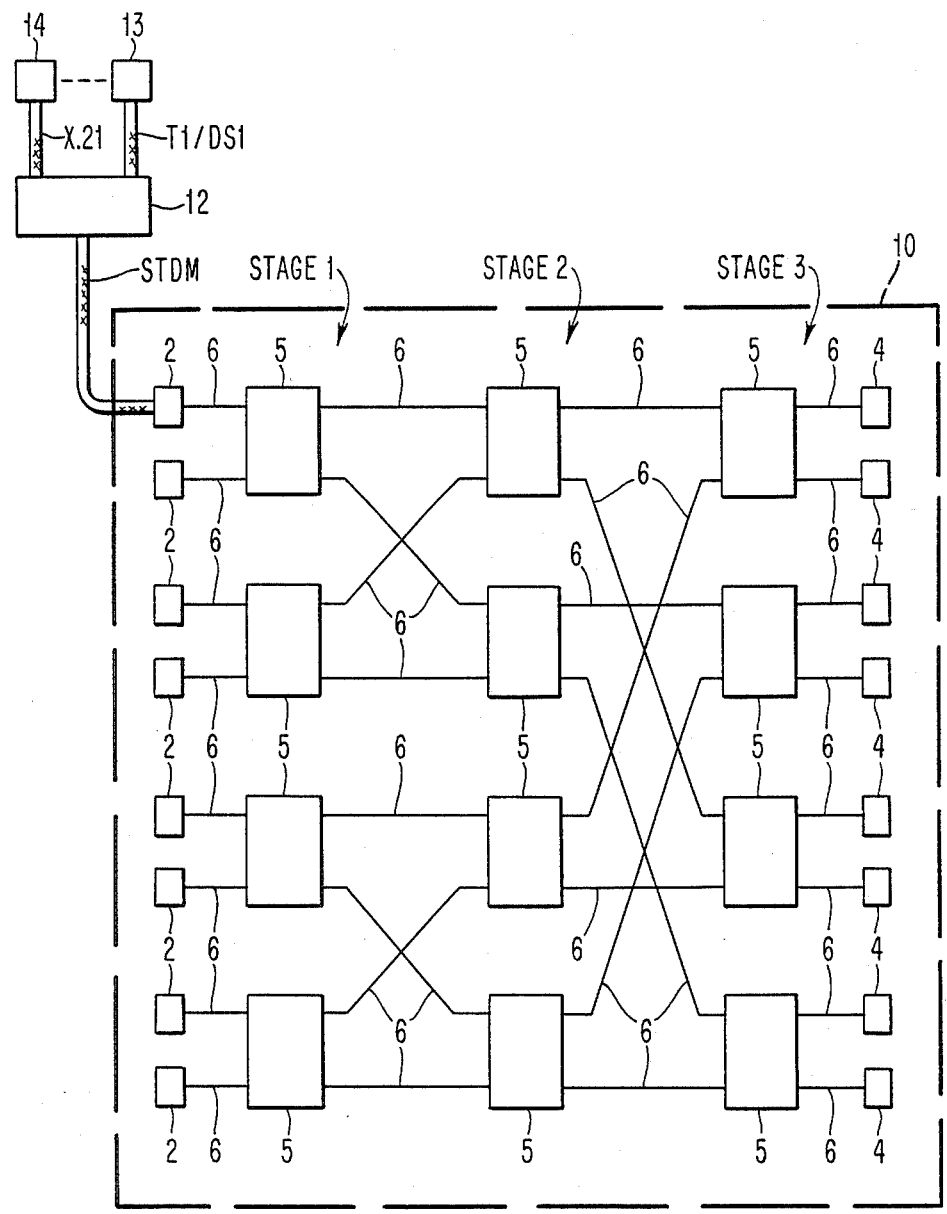
FIG. 1 is a block diagram of a multistage interconnection switching network that embodies this invention.

FIG. 1 shows a block diagram of the multi-stage interconnection switching network 10 that embodies this invention. The switching network is intended to be used in the implementation of a telecommunication network that is comprised of clear channel circuit switching and packet data switching. Communication devices interface with the switching network through InterFace modules (I/F Module) 12 which generate packet streams in statistical time division multiplexed formats. An I/F Module supports circuit transport 13 and packet transport devices 14 which use different user interfaces. An example of circuit transport interface is the generic T1/DS1 with D4 format and an example of packet transport interface is the X.21 or RS232C physical link supporting X.25 protocol. Although an ISDN interface is not necessarily implemented, an I/F Module could be open ended to permit expansion to service users of ISDN attaching device.

The multistage interconnection network comprises a number of switch elements 5, which are used to interconnect links 6 of the network. The links to the extreme left of FIG. 1 and immediately to the right of input adapters 2 will be referred to as the inputs of the network, while the links at the extreme right of FIG. 1 and immediately to the left of output adapters 4 will be referred to as the outputs of the network. The network shown is a three stage network with a column for switching elements at each stage. The network shown also has eight inputs and eight outputs. A connection from any one of the inputs, through a switching element in each stage of the network, and through the links interconnected by those switching elements to any one of the outputs, is referred to as a path. Thus, for example, an electrical connection that might be set up between the input adapter at the top left of FIG. 1 to the output adapter at the top right of FIG. 1 is a path. This path would be set up by the four links at the top of FIG. 1 and the three switching elements at the top of FIG. 1.

Figure 2:
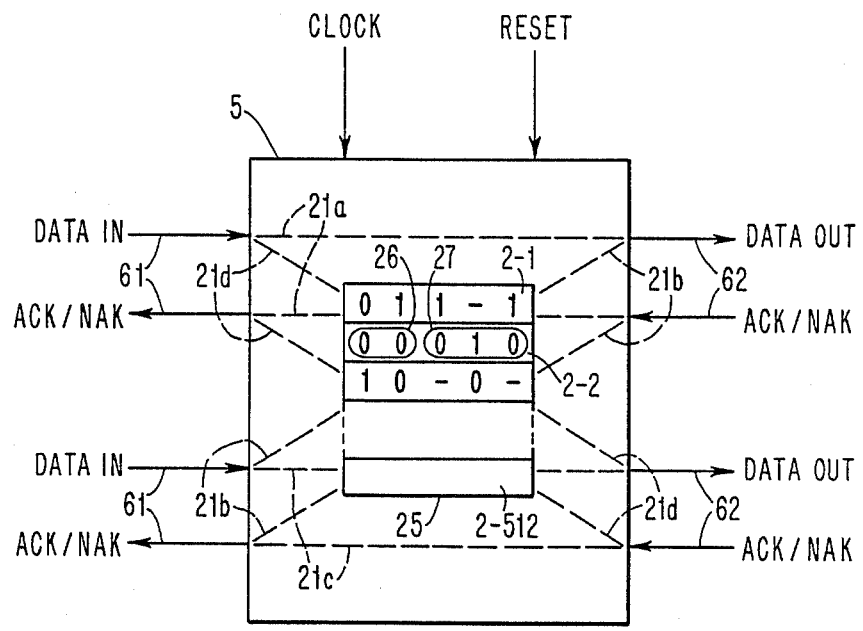
FIG. 2 is a more detailed schematic of the switching elements.

Shown in FIG. 2 is a more detailed schematic of the switching elements 5 shown in FIG. 1. The switching element shown has two inputs 61 which are connected to a pair of links of the network, and two outputs 62 which are also connected to another pair of links of the network. In this application, the term input shall be used synonymously with the term "input port". The switching elements also include a state memory or shift register 25. This state memory or shift register has 512 storage locations 2-1 through 2-512 in this example.

Each memory location has the capacity to store at least 5 bits therein. The first and second bit at the left side of each location are referred to as "switch pending state bits". See, 26 in FIG. 2. These first and second bits, respectively, are used to indicate whether the lower and the upper inputs are in the switch pending state (see below). A "1" bit represents that the corresponding input is in the "switch pending state". The term state will be described below. The three bits on the right of each storage location, see 27 for example, are the configuration bits which are used to represent the configuration that the switching element is to assume during the time slot corresponding to that respective storage location. The memory for shift register 25 has included therein, in this particular embodiment, 512 storage locations to correspond to 512 time slots of a frame. Thus, for example, the 5 bits stored in storage location 2-2 are used to indicate, that during time slot 2 of the frame, the corresponding switching element inputs are not in a switch pending state (first two bits are 00), and the configuration is represented by the 010. The dotted lines 21a, c and d in FIG. 2 represent four potential electrical connections from the inputs of the switching element to the outputs of the switching element.

FIG. 3 is used to illustrate the various configurations that the switching elements can assume. The left side of FIG. 3 shows the 8 possible configurations that a 2×2 switching element can assume. The corresponding 3 bit code (configuration bits) on the right of FIG. 3 is used to represent the corresponding configuration of the switching element immediately to its left in FIG. 3. Thus, for example, 010 corresponds to the configuration 30-4 immediately to the left of these bits. In any given time slot of a frame, the switching elements can assume, in this embodiment, any of the 8 configurations shown in 30-1 through 30-8 of FIG. 3. For example, with the configuration shown by 30-4 and represented by the bits 010, the link connected to 61-1 would be electrically connected to the link connected to the output 62-1, while the link at input at 61-2 would not be connected to any output.

The network is operated in frames consisting of a fixed number of bits per frame. As an example we will consider 512 bits per frame. Each bit in the frame will be used either to attempt to set up a connection, or to transport data for an established connection. A channel will first set up a connection by claiming a path through the network for a specific bit in the frame, called a slot. It will then use the same path and the same slot in each subsequent frame until it breaks down the connection. In the illustrative numbers above, a channel transmits at 64 Kbps and uses one slot, and there are 512 slots per frame; hence, the network must transmit data at 32 Mbps.

We first describe how a connection is established at a (2×2) switching element within the network. The same protocol is used at all switching elements at any stage in the network. When no connection exists at a switching element input in a slot, a bit 0 is received at that switching element input port for that slot. A connection request to a switching element input is signaled by an incoming bit 1 during a slot at that switching element input which must be in the unconnected state. This 1 bit is referred to as a start bit. A switching element input is in the unconnected state when that input of the switching element is not connected to any output of the switching element. After the start bit is received, in the same slot of the next frame, the switching element request setting bit, (i.e., request for connection to upper or lower output of this switching element) is received. For the switching element to know that this switch request setting bit is to be received, another state for that input is required. We will refer to this state as the "switch setting pending" state at that switching element input port, represented by a "1" bit of the corresponding switch pending state bit. When the switching element setting request bit is received, the switching element determines if the requested output is busy, and immediately sends back a positive or negative acknowledgement to the ACK/NAK line of the input.

A "0" represents NAK, while a 1 represents an ACK. If gate delays preclude the ACK/NAK from being sent back to the input in the same slot, the ACK/NAK can be sent back in the same slot of the next frame without changing the protocol except for an extra frame delay in detecting a collision. If the requested output is free, the connection is established, and the state for the input is set to the "connection established" state. Simultaneously, a bit 1 is placed at that output, indicating a connection request to the subsequent stage. An ACK/NAK that is received at a switch output that has a connection established to some input of the same switch is sent back on the ACK/NAK line at that input in that slot in the next frame. For an unconnected state at an input, the ACK/NAK line is always at zero, indicating a negative acknowledgement. In the "switch setting pending" state, the ACK/NAK line at the input is set to one. Note that extra bits per input are necessary to encode the three states that the switch input can assume. Adding this to the three bit encoding previously listed, yields a 5 bit encoding per slot (see FIG. 2).

We now describe how a path is established across the entire network. Suppose that the adapter needs to set up a path for some channel to a specific output port. The adapter knows which slots in the frame are unused. It selects a free slot and sets a high logic level, i.e., a connection request, at the switch input to which it is connected. In the same slot of the next frame, it sends the first bit of the configuration bits, indicating the requested switch setting in the first stage of the network. At the end of the slot, it gets an ACK or a NAK indicating whether the path was established at stage one of the network. If a NAK is received, the adapter looks for another free slot in the frame and repeats the path setup procedure. If a connection is established in stage 1 of the network, indicated by an ACK, the adapter sends the next bit of the destination address in the same slot of the next frame. As described above in the connection setup for a switching element, the switching element in stage 1 that successfully set up a requested connection to its output will relay the stage 2 switch setting request. Stage 2 will send back an ACK or NAK to the stage 1 switch, depending on whether the requested stage 2 connection was successfully set up or not. In turn, stage 1 will relay this ACK or NAK to the adapter in the same slot of the subsequent frame. The adapter sends out successive bits of the configuration bits, one bit for each stage, and one bit per frame. Note that an ACK or NAK from a stage in the request connection ripples back one stage at a time. Thus, the worst case time between an adapter requesting a setup and a NAK, is 2n, where n is the number of stages. This worst case occurs if there is a contention at the last stage in the network.

Once a path is established, as described above, the adapter will use the same slot in subsequent frames to send data bits from the channel using that connection. Since each switching element reserves the path for established circuits, an established path is never blocked and no data bits are lost. Further, since the switch setting for each bit is set up, a one bit transport delay at each stage of the network is realized. Since a path may be assigned any bit in the frame, a channel may perceive a maximum switching delay of one frame plus one frame bit per stage. Since the number of stages is typically small as compared to the number of bits in the frame (say maximum of 10 stages versus, say, 512 bits per frame) the maximum delay perceived by a channel is close to a frame length, with an average of about one half of a frame length. Since the frame length must be at most one channel bit time (because one channel bit is transmitted per frame) the channel perceives a maximum delay of about one channel bit time and an average delay of one half channel bit time.

An established path is broken down as follows. The input adapter sends the output adapter a special bit pattern. The output adapter then sets a NAK in the corresponding slot at the output port of the switch to which it is connected. This NAK, traverses backwards, one stage per frame, breaking down the path or connection one stage at a time, until the entire connection is broken down. Notice that this does not require special processing at the switch; it is the same as the action during connection or path setup when a later stage in the network cannot set up a requested path. Each switch along the path, sets the input of the switching element to a no connection state when it receives a NAK at its output.

The operation of the multistage interconnection network of FIG. 1 will now be described. These networks are self routing in that, one bit of the desired output address can be used at each stage of the network to route a connection through the network. An adapter is connected to each input and output port of the MIN. In the basic scheme, a number of fixed rate channels to be switched through the network are connected to each adapter. Another scheme for another application will be described below. The basic scheme is desirable in relatively low traffic situations wherein blocking is not a problem. For clarity in presentation, we will use (a round number) 64 Kbps channels and assume that the network is constructed from (2×2) switching elements. These channels may be presented to the adapter individually or grouped together in super-channels. The basic scheme immediately described below shows how the network is operated, connections through the switch are established, data is transmitted across an established channel, and how a connection is broken down. Some modification and restrictions will be applied to the basic scheme to reduce blocking in high traffic situations.

The basic scheme described how an adapter establishes a connection for a channel corresponding to a slot in a frame. The connection or path establishment is done in parallel for all adapters, makes use of the self routing property of the MIN, and is hence very efficient. This allows the network to be used in either the packet or circuit switched modes. For packet switching, the connection reserving a slot is set up and broken down for the duration of a single packet. For circuit switching, the connection is held for the duration of the circuit. For burst switching (as in voice with silence detection), the connection can be broken and reestablished for each burst. Note that, as opposed to a Fast Packet Switch where real time packets may be lost due to stochastic delay in the network, in the multistage bit switch once a connection is established the slot is reserved until it is broken down and no bits are lost due to contention in the network. Thus, internally the network is operated in a circuit switched fashion but the efficient and parallel set up of connections can make it appear as a packet switch to channels. While fixed size channels (64 Kbps per channel in the example) have been assumed, multiple slots in a frame can be requested to obtain bigger channels.

The basic scheme described the network as bit-switched, with a single bit sent in a slot. While this is obviously the minimum size of a slot, the slot can be increased to a byte, word, or larger, depending on the application. So, for instance, if a slot is a byte wide, multiplexing at the switching elements is a byte as a time, and the entire connection address can be sent in a single slot. The modifications to the protocol in the basic scheme is straightforward. The switching element size was assumed to be (2×2). This also can be increased if so desired. However, the number of states increases with switch size, and the simplicity of the (2×2) switching element may be desirable.

MODIFICATION OF THE BASIC SCHEME

The method described above applies basically to the basic scheme, however, where more throughput is required, a more complicated method, which is a modification of the basic scheme, should be employed. As described in the basic scheme above, a channel is set up by claiming a path through the network for a specific slot in a frame and in each subsequent frame until the channel is no longer needed and the path is broken down. However, with the modified scheme, a channel is set up by setting parts of a given path during different timeslots. Thus a part of the given path through the first stage of the network will be established during one slot in a sequence of frames, while another part of the given path through say the second stage will be established during another slot in the sequence of frames.

The modified scheme is the same as the basic scheme except for differences described below.

Since a communication link is operated in a slotted frame fashion, each slot represents a fraction of link bandwidth. In order to improve the utilization of the link bandwidth by reducing blocking relative to the basic scheme, the slot allocation could be dynamic in the sense that a channel using a slot i at a stage has the freedom to select any free slot at the following stage.

As in the basic scheme, when no connection exists at a switching-element input in a slot, a bit 0 is received at switching-elements input port for that slot. Also as in the basic scheme, a connection request to a switching-element input is signaled by an incoming bit 1 (the start bit) during a slot at that switching element input which must be in the unconnected state. This bit 1 is referred to as a start bit. Also in the basic scheme, in the same slot of the next frame, the switching-element request-setting-bit (which is in the destination adapter address at the same position as the stage location of the switch element in the network) referred to as staging address is received. Using this bit, the switching-element determines the connection to upper or lower output port of the switching-element. When a start-bit is received at a stage, the component enters a state of Path Pending and waits for the staging address coming at the same slot of the next frame. As soon as the first bit of staging address arrives, the switching-element allocates a free slot in the output port frame for forwarding the start-bit and address bits for the later stages using the same output slots in the next several frames with the staging address for itself removed. In the basic scheme, however, a switching element determines if the requested output is busy during a slot corresponding to the slot of an earlier frame in which the request arrived. In the modified scheme, the switching element searches for any slot in a frame in which the output is not busy. Thus with the modified scheme, synchronous or asynchronous data will be transmitted through each stage of the network during different time slots of a frame and in subsequent frames. The same protocol is used at all switching-elements at any stage in the network. Eventually, the start-bit will reach the output adapter. The way a channel requests a path of multiple slots is initiated from the input adapter by sending n start-bits in a n unused slots followed by the same staging address in each slot.

Figure 4:
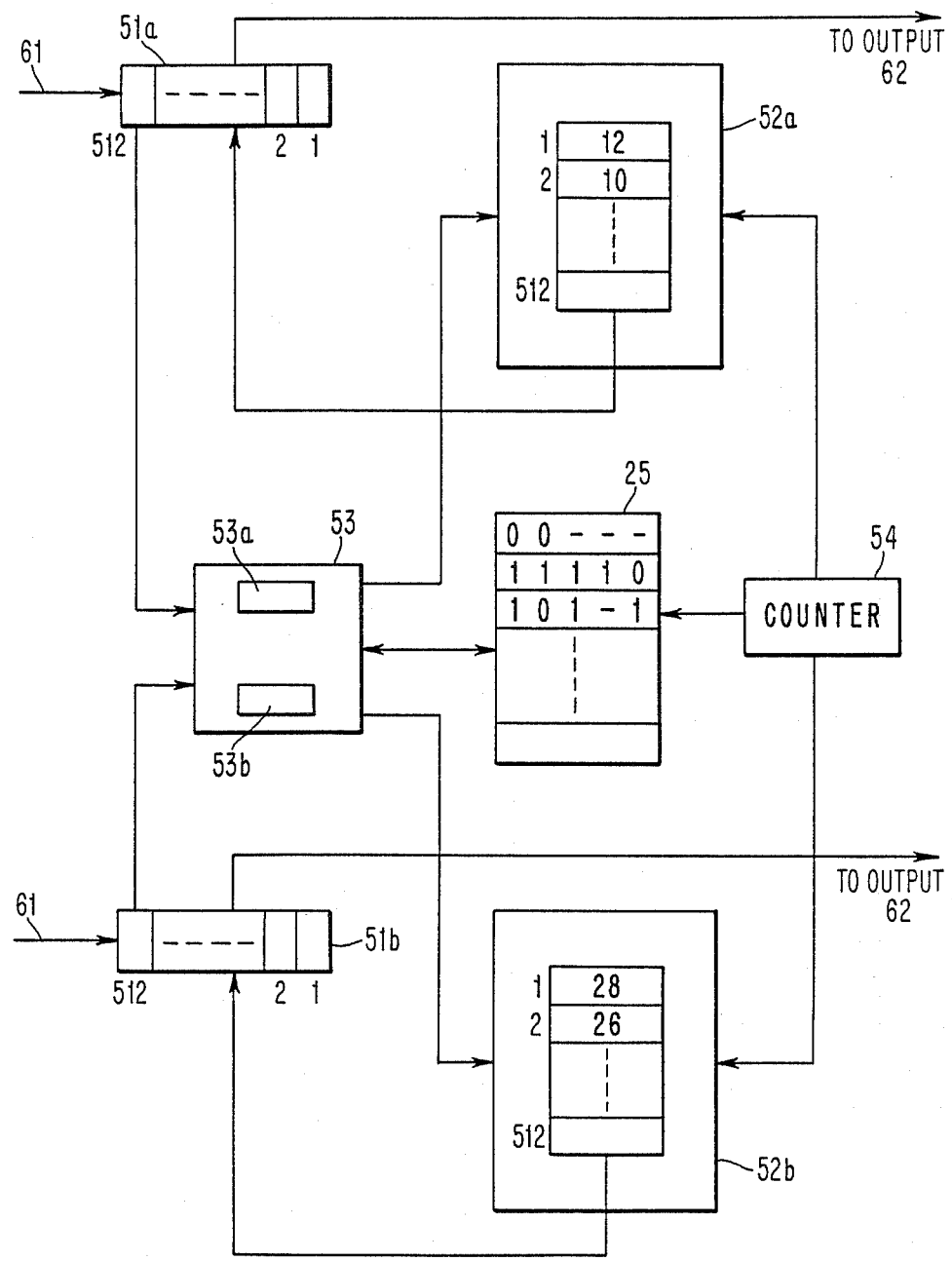
FIG. 4 is a block diagram of a switching used for the modified scheme for this invention.

FIG. 4 is the block diagram of the switching element used for the modified scheme. Essentially, two frame buffers 51a and 51b, two Time Slot Interchange (TSI) connection tables 52a and 52b, and a Control Processor 53 (CP) with two input status registers 53a and 53b are added to the switching element used in the basic scheme.

The state memory 25 remains the same, but the status of the outputs of the switching element is defined by respective bits in a respective storage location. The basic scheme, on the other hand, uses the same corresponding bits to identify the state of the inputs, rather than the status of the outputs. The term status refers to whether an output is free or busy. Thus, in the modified scheme the status of the outputs of the switching elements are known, but this knowledge does not directly yield the status of the inputs of the switching elements. Therefore, additional two input status registers 53a and 53b are used for that purpose. As an alternative to the use of input status registers, two more bits could be added to each memory location in the state memory to indicate whether the output is free or busy.

The frame buffer, one for each input line, has the capacity to hold up to one frame of information bits which are stored sequentially according to the input sequence. The TSI connection table, also one for each input line, provides the sequence of data bits to be switched by the switching element to the output lines.

The CP decodes the bits in the state memory and the bits coming from the input line. The CP also schedules the switching sequence of input bits to output lines.

When a connection request is detected by the CP circuitry in an input slot, say $S_i$, CP raises a flag in input status register, say 53a, to indicate that the switching element input is to be in a request pending state during time slot $S_i$. In the same slot of the following frame, the bit in the input link has the output link address (0 for upper, 1 for lower) for the connection to be established. Instead of checking the connection status of slot $S_i$, as in the basic scheme, CP selects any free channel $S_o$ in the requested output and assigns $S_o$ for the request. The CP then updates the state memory at the $S_o$ entry to reflect the new request and connection. At the same time, the content of $S_i$ is stored into the entry of $S_o$ in the corresponding TSI connection table 52a.

Notice that a significant delay, say D, could be incurred in the CP to schedule and update table entries. Therefore, the CP circuitry should be fast enough so that D is less than the frame size.

The rest of the connection procedure is similar to the basic scheme. Namely, the ACK/NAK is sent back in the same slot (SI) of the next frame. In the slot So, which is at least one frame away from Si, the request for the connection at the next stage is sent.

Once a path is established, the adapter and switching elements at every stage will use the slots which are determined during the connection setup. Therefore, at slot 2, for example, counter 54, in FIG. 5, the second (2nd) entry of the state memory is used to make connection of the switching element as one of the seven configurations shown in FIG. 3. Rather than taking the input bit of the second (2nd) slot for switching, the contents of the second (2nd) entry in TSI connection table 52a and 52b for the outputs define the bit locations in the frame buffers. The bits in those locations will then be sent to the respective outputs of the switching element. In this case, the tenth (10th) bit in frame buffer 51a and the twenty-sixth (26th) bit in frame buffer 51b are sent to the upper output 62 and the lower output 62, respectively.

The protocol for breaking down a path is similar to the one for the basic scheme. Except that when a NAK received at say slot T, not only does the switching element set entry T of state memory to a no connection state, but it also decodes the content of state memory to identify the corresponding input lines and decodes content of TSI connection table to identify the corresponding input slots. The switching element then updates the state of the identified input status registers to idle state.

ADAPTER FOR BASIC AND MODIFIED SCHEME

Figure 5:
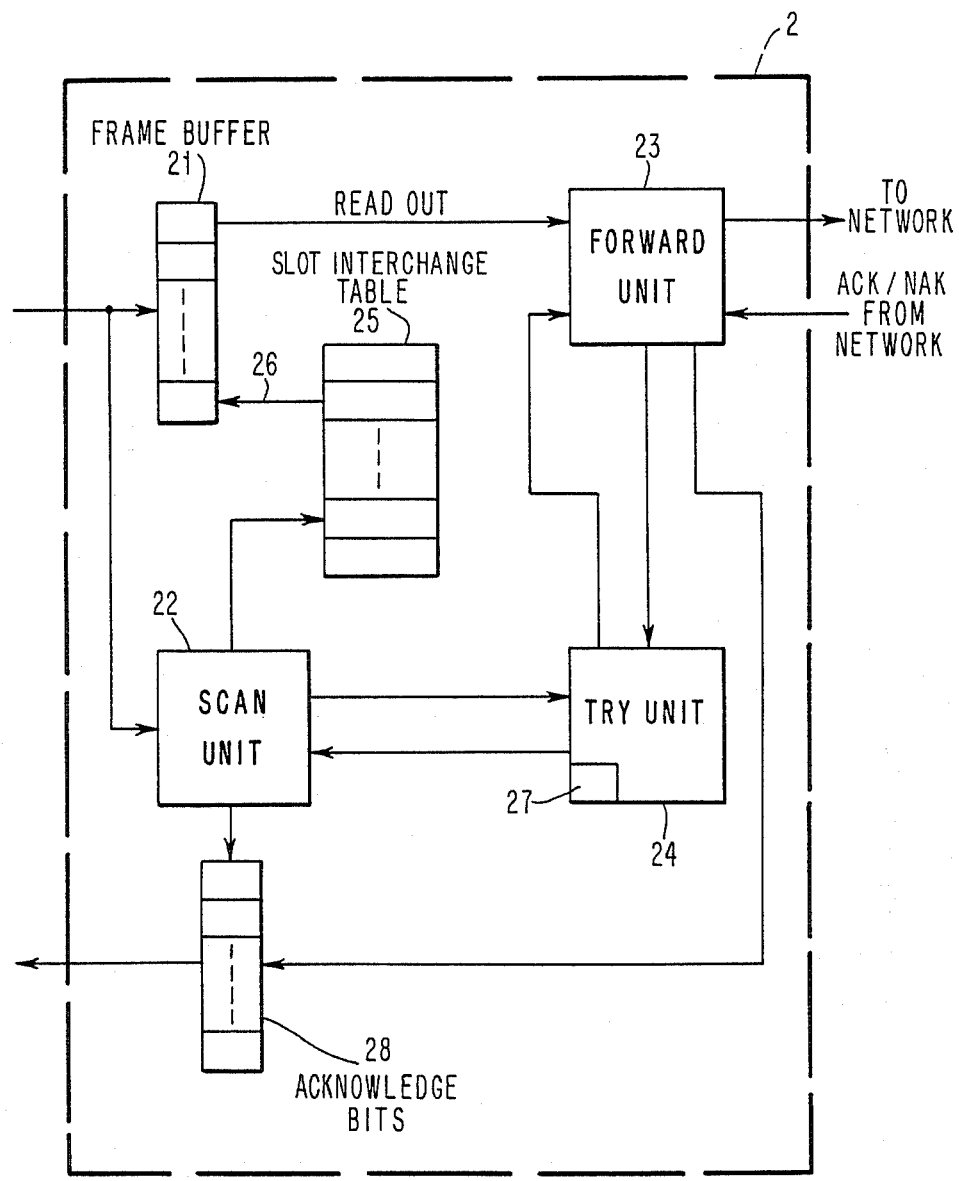
FIG. 5 is a block diagram of the adapter.

A block diagram of the input adapter (see 2 of FIG. 1) is shown in FIG. 5. The input adapter has the following sub-units: frame buffer 21, scan unit 22, forward unit 23, try unit 24, and slot interchange table 25. The output port adapter, on the other hand, receives from the last stage of the network and sends these to the output line.

Frame Buffer 21: The frame buffer contains as many bits as slots in a frame. In each slot it captures the incoming bit and stores it in the corresponding bit of the frame buffer. The frame buffer supports a read from any bit position and a write to any bit position in one clock cycle. If the read and write positions are the same then the old contents of the register are read out and then replaced by the new contents being written in. The address of the location to be read out is obtained from the scan unit 22. The contents read out from the frame buffer 21 are presented to the forward unit 23.

Scan Unit 22: In each slot the incoming bit is captured by the scan unit (and also the frame buffer 21). The scan unit contains a slot use register, with one bit for each slot. Initially, this register is set to 0 to indicate that no slots are in use. The scan unit also contains a call set-up register, with one bit for each slot; a bit 1 in this register indicates that a call request is being processed for the corresponding slot. If a slot is not in use, indicated by a 0 in the corresponding bit of this slot use register, and if the corresponding bit of the call set-up register is 0, then the acknowledge bit (see below) and the register in the slot interchange table designated for this slot are reset.

If a 1 bit is received by the input adapter in a slot that is not in use, indicated by a 0 in the corresponding bit of the slot use register, this is indicative of a call set-up request; the corresponding bit of the call set-up register is set to 1, and the acknowledge bit designated for this slot is set to 1. The scan unit then collects the next n-bits received in the same slot of subsequent frames (where n is the number of stages in the network) and sends a calls request packet to the try unit; the call request packet contains the slot number (in-slot) in which the call request was received, and the next n-bits received in the slot on subsequent frames. The scan unit also receives messages from the try unit 24 indicating if a circuit connection has been established corresponding to a call setup request, or indicating that such a circuit connection cannot be established. For circuit connections that are established, the message contains the slot number in which the request arrived (in-slot number), and the slot in which the circuit connection was established (out-slot number). On receiving this message, the scan unit 22 enters the out-slot number in the location in-slot of the slot interchange table 25, resets the corresponding bit of the call request register to 0, and sets the corresponding bit of the slot use register to 1. If the request cannot be satisfied, the scan unit resets the acknowledge bit corresponding to the in-slot number in the acknowledge bit table (see below).

Acknowledge Bits 28: The acknowledge bits are used by the port adapter to acknowledge that a circuit connection has been established in response to a call set-up request. The acknowledge bits are set by the scan unit 22. For call set-up requests, the designated acknowledge bit is set to 1 when the request is received. It is reset to 0 when the scan unit receives a message from the try unit indicating that the request cannot be satisfied, or when the acknowledge line from the first stage switching element returns a 0, indicating that the connection has been terminated.

Slot Interchange Table 25: The slot interchange table is a register file containing as many registers as the number of slots in a frame. The registers in this table are set or reset by the scan unit as described earlier. One register can be set and another reset in the same slot. In each slot (e.g., slot 5), the contents of the register corresponding to the slot (register 5 in the slot interchange table for the example) are forwarded to the frame buffer 21 on the scan bus 26. The frame buffer uses this address to select the entry to be read out and sent to the forward unit 23.

Forward Unit 23: The forward unit 23 multiplexes inputs from the frame buffer and from the try unit. In each slot, if the corresponding bit of the slot use register is 1, then the frame buffer input is selected, while if this bit is 0, then the try unit input is selected. The forward unit sends the selected data bit to the switching element in the first stage of the network, connected to this input adapter. The forward unit also receives an acknowledge from the network indicating whether the packet was successfully transmitted over the network (see below). The NAK line bit is sent to try unit 24 and the acknowledge bits 28. If a 0 bit (NAK) is received on this line, the corresponding acknowledge bit of the input adapter is reset (see above).

Try Unit 24: The try unit 24 receives call set-up requests from the scan unit 22. The call request packet indicates the slot (in-slot) in which the packet arrived on the input line, and the requested output line address to which the connection is to be established. The call request packet is stored in a pending request queue 27. The try unit selects a free slot (i.e., with 0 in corresponding slot use register) in which to attempt to set up a connection. The try unit then sends one bit of the call request in the selected slot of subsequent frames until the entire call request has been sent or a NAK is received from the forward unit in that slot. The call request sent out starts with a 1 bit and is followed by the setting for each stage of the network, one bit at a time. If no NAK is received 2n frames (where n is the number of stages in the network) after the last bit of the call request is sent out, then the circuit has been set up, otherwise the try unit selects the next free slot and retires the above procedure to set up the desired connection. If a connection is established, the try unit sends a message to the scan unit indicating the slot in which the request arrived (in-slot) and the slot in which the circuit was established, and the try unit deletes the packet from the head of the pending queue. If the try unit cannot set up a connection on any free slot in the frame, it sends a message to the scan unit indicating non-availability of the desired circuit, and deletes the call request packet from the pending queue.

Having thus described our invention, what we claim as new, and desire by Letters Patent is:

1. A method of controlling a multistage interconnection network for the switching of synchronous and asynchronous data, the network having a number of switch elements used to interconnect a number of conductive links used to forward the synchronous and asynchronous data from selected inputs of the switching elements to selected outputs of the switching elements during each frame of a first sequence of frames, the network also having a number of input adapters so that there is an input adapter for each input of each switching element of a first stage of the multistage interconnection network, the method of comprising the steps:
   (a) storing configuration bits in the switch elements by transmitting the configuration bits over the same said links that are used for the transmission of said data, each configuration bit being transmitted from an input adapter of said input adapters without passing through a central controller, each configuration bit (of the configuration bits) being transmitted in any free slot of a frame of the sequence of frames, each said configuration bit being used to indicate the output to be used by an associated switching element in establishing a path through the multistage interconnection network, the association between a switching element (of the switching elements) and a configuration bit (of the configuration bits) being identified according to which frame in a sequence of frames the configuration bit is transmitted; and
   (b) setting the configuration of each of the switch elements during each particular time slot to correspond to the configuration represented by a corresponding set of configuration bits stored in each respective switch element, each configuration of each of the switching elements being used to interconnect selected links, of the links of the network, at the inputs of each respective switch element to selected links at the outputs of each respective switching element, each of the selected links being used to forward data from one of the switch elements to another of the switch elements of the network.

2. A method as recited in claim 1, wherein the step of storing bits further comprises:
   storing a number of bits in each storage location (of the storage locations) of each switching element (of the switching elements) to indicate one of three states that each respective switching element can assume during a time slot corresponding to each respective storage location, the three states being: a switch setting pending state, a connection established state and an unconnected state, said number of bits being stored in each storage location by transmitting said number of bits from a respective one of the input adapters.

3. A method as recited in claim 1, wherein each of the input adapters transmits configuration bits or data independently of configuration bits or data being transmitted from any other of the input adapters.

4. A method as recited in claim 1, wherein each of the switching elements change configuration during each of a sequence of time slots with each time slot having a duration of one bit.

5. A method of controlling a multistage interconnection network for the switching of synchronous and asynchronous data, the network having a number of switch elements used to interconnect a number of conductive links to establish transmission paths from selected inputs of the network to selected outputs of the network during each corresponding time slot of selected time slots in each frame of a first sequence of frames, the network also having a number of input adapters so that there is an input adapter for each input of each switching element of a first stage of the multistage interconnection network, the method comprising the steps of:
   (a) storing configuration bits in the switch elements by transmitting the configuration bits over the same said links that are used for the transmission of said data, each configuration bit being transmitted from an input adapter of said input adapters without passing through a central controller, each configuration bit (of the configuration bits) being transmitted in a corresponding time slot of a frame of a second sequence of frames, each configuration bit being used to indicate the output to be used by an associated switching element in establishing a path through the multistage interconnection network during a corresponding time slot, the association between a switching element (of the switching elements) and a configuration bit (of the configuration bits) being identified according to which frame in the second sequence of frames the configuration bit is transmitted, each configuration bit that is used to establish a path during a corresponding time slot being transmitted in the same corresponding time slot but in a different frame (of the second sequence of frames) than that used by any other configuration bit to establish the path during the corresponding time slot; and
   (b) setting the configuration of each of the switching elements during each particular time slot to correspond to the configuration represented by the configuration bits stored in a respective storage location corresponding to the particular time slot, each configuration of each of the switching elemnent being used to interconnect selected links of the links at the inputs of each respective switching element to selected links of the links at the outputs of each respective switching element, each of the paths being establishd from the interconnection of a number of the selected links during the same corresponding time slot in each frame of a sequence of frames.

6. A method as recited in claim 5 wherein the step of storing bits comprises storing three configuration bits in each storage location (of the storage locations) of a switching element (of the switching elements) to represent any one of seven possible configurations the switching element can assume during a time slot in each of a number of frames in the first sequence of frames.

7. A method as recited in claim 5, wherein the step of storing bits comprises storing a number of the bits in each storage location (of the storage locations) of each switching element (of the switching elements) to indicate a state of that respective switching element during the time slot corresponding to each respective location, said number of bits being stored in each storage location by transmitting said number of bits from a respective one of the input adapters.

8. A method as recited in claim 7, wherein the switching element input can assume any one of three states: a switch setting pending state, a connection establishd state and an unconnected state.

9. A method as recited in claim 5, wherein step (b) of claim 1 will only occur if the switch is in a connection established state during the respective time slot in which the switching element configuration is to be changed.

10. A method as recited in claim 5, wherein each of the switching elements change configuration during each of a sequence of time slots with each time slot having a duration of one bit.

* * * * *